(12) United States Patent
Lee et al.

(10) Patent No.: US 8,621,389 B2
(45) Date of Patent: Dec. 31, 2013

(54) SELECTIVE VIEWING OF INFORMATION

(75) Inventors: Matthew Richard Lee, Belleville (CA); Keizo Marui, Waterloo (CA)

(73) Assignee: BlackBerry Limited, Waterloo (CA)

( * ) Notice: Subject to any disclaimer, the term of this patent is extended or adjusted under 35 U.S.C. 154(b) by 177 days.

(21) Appl. No.: 11/617,961

(22) Filed: Dec. 29, 2006

(65) Prior Publication Data

US 2008/0163110 A1    Jul. 3, 2008

(51) Int. Cl.
*G06F 3/048* (2013.01)

(52) U.S. Cl.
USPC .................................................. 715/810

(58) Field of Classification Search
USPC .................................................. 715/810
See application file for complete search history.

(56) References Cited

U.S. PATENT DOCUMENTS

| | | | |
|---|---|---|---|
| 4,977,503 A | 12/1990 | Rudnick | |
| 6,750,850 B2 | 6/2004 | O'Leary | |
| 6,993,362 B1 * | 1/2006 | Aberg | 455/566 |
| 2003/0001865 A1 * | 1/2003 | Hirose et al. | 345/619 |
| 2003/0011564 A1 * | 1/2003 | Ushino et al. | 345/156 |
| 2003/0122882 A1 * | 7/2003 | Kho | 345/864 |
| 2004/0119755 A1 | 6/2004 | Guibourge | |
| 2006/0148531 A1 * | 7/2006 | Iwata et al. | 455/566 |
| 2006/0229097 A1 | 10/2006 | Flynt et al. | |
| 2007/0120819 A1 * | 5/2007 | Young et al. | 345/156 |
| 2007/0152979 A1 * | 7/2007 | Jobs et al. | 345/173 |
| 2007/0204232 A1 * | 8/2007 | Ray et al. | 715/738 |
| 2008/0016465 A1 * | 1/2008 | Foxenland | 715/828 |
| 2008/0042984 A1 * | 2/2008 | Lim et al. | 345/173 |
| 2008/0086703 A1 * | 4/2008 | Flynt et al. | 715/853 |

FOREIGN PATENT DOCUMENTS

EP    1104151 A2    5/2001

OTHER PUBLICATIONS

Examination Report, Canadian Patent App. No. 2,572,606, issued Jun. 29, 2009.
Office Action mailed Dec. 17, 2012, in corresponding Canadian patent application umber 2,572,606.
Office Action mailed Jul. 2, 2010. In corresponding application No. 2,572,606.
Office Action mailed Sep. 29, 2011. In corresponding application No. 2,572,606.

\* cited by examiner

*Primary Examiner* — William Bashore
*Assistant Examiner* — Henry Orr
(74) *Attorney, Agent, or Firm* — Novak Druce Connolly Bove & Quigg LLP

(57) ABSTRACT

A system and method is disclosed that provides for the displaying, on display screen of an electronic device, a list of contact names, and further provides for the designating, by sequentially scrolling through the list of contact names, individual contact names in the list of contact names and wherein designation of an individual contact name reveals available information about the contact.

20 Claims, 10 Drawing Sheets

SELECTIVE VIEWING OF INFORMATION

A portion of the disclosure of this patent document contains material which is subject to copyright protection. The copyright owner has no objection to the facsimile reproduction by any one of the patent document or patent disclosure as it appears in the Patent and Trademark Office patent file or records, but otherwise reserves all copyright rights whatsoever.

FIELD

The present disclosure, in a broad sense, is directed toward handheld electronic devices including those without communication capabilities such as Personal Digital Assistants (PDAs), and more specifically the disclosure is directed toward handheld communication devices that have wireless communication capabilities and the networks within which the wireless communication devices operate.

BACKGROUND

With the advent of more robust wireless communications systems, compatible handheld communication devices are becoming more prevalent, as well as advanced. Where in the past such handheld communication devices typically accommodated either voice transmission (cell phones) or text transmission (pagers and PDAs), today's consumer often demands a combination device capable of performing both types of transmissions, including even sending and receiving e-mail. Furthermore, these higher-performance devices can also be capable of sending and receiving other types of data including that which allows the viewing and use of Internet websites. These higher level functionalities necessarily require greater user interaction with the devices through included user interfaces (UIs) which may have originally been designed to accommodate making and receiving telephone calls and sending messages over a related Short Messaging Service (SMS). As might be expected, suppliers of such mobile communication devices and the related service providers are anxious to meet these customer requirements, but the demands of these more advanced functionalities have in many circumstances rendered the traditional user interfaces unsatisfactory, a situation that has caused designers to have to improve the UIs through which users input information and control these sophisticated operations.

BRIEF DESCRIPTION OF THE DRAWINGS

Exemplary methods and arrangements conducted and configured according to the advantageous solutions presented herein are depicted in the accompanying drawings wherein:

FIG. 4 illustrates an exemplary QWERTY keyboard layout;

FIG. 5 illustrates an exemplary QWERTZ keyboard layout;

FIG. 6 illustrates an exemplary AZERTY keyboard layout;

FIG. 7 illustrates an exemplary Dvorak keyboard layout;

FIG. 8 illustrates a QWERTY keyboard layout paired with a traditional ten-key keyboard;

FIG. 9 illustrates ten digits comprising the numerals 0-9 arranged in a telephone keypad configuration, including the * and # flanking the zero;

FIG. 10 illustrates a numeric phone key arrangement according to the ITU Standard E.161 including both numerals and letters;

DETAILED DESCRIPTION

Figure 1:
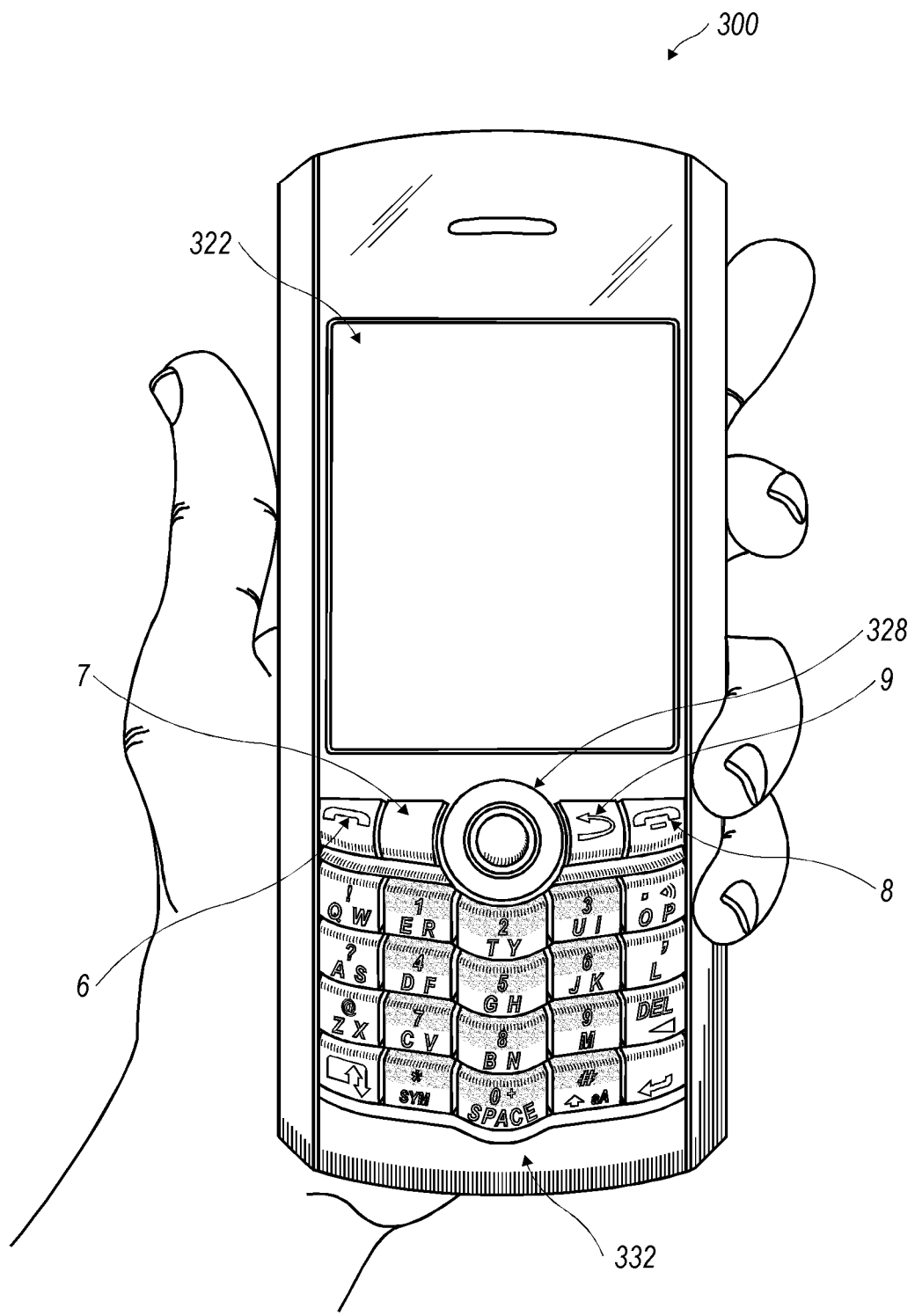
FIG. 1 depicts a handheld communication device cradled in the palm of a user's hand.

As intimated hereinabove, one of the more important aspects of the handheld electronic device to which this disclosure is directed is its size. While some users will grasp the device in both hands, it is intended that a predominance of users will cradle the device in one hand in such a manner that input and control over the device can be affected using the thumb of the same hand in which the device is held, however additional control can be effected by using both hands. As a handheld device that is desirably pocketable, the size of the device must be kept relatively small. Of the device's dimensions, limiting its width is important for the purpose of assuring cradleability in a user's hand. Moreover, it is preferred that the width of the device be maintained at less than ten centimeters (approximately four inches). Keeping the device within these dimensional limits provides a hand cradleable unit that users prefer for its useability and portability. Limitations with respect to the height (length) of the device are less stringent when considering hand-cradleability. Therefore, in order to gain greater size, the device can be advantageously configured so that its height is greater than its width, but still remain easily supported and operated in one hand.

A potential problem is presented by the small size of the device in that there is limited exterior surface area for the inclusion of user input and device output features. This is especially true for the "prime real estate" on the front face of the device, where it is most advantageous to include a display screen that outputs information to the user. The display screen is preferably located above a keyboard that is utilized for data entry into the device by the user. If the screen is provided below the keyboard, a problem occurs in that viewing the screen is inhibited when the user is inputting data using the keyboard. Therefore it is preferred that the display screen be above the input area, thereby solving the problem by assuring that the hands and fingers do not block the view of the screen during data entry periods.

To facilitate textual data entry, an alphabetic keyboard is provided. In one version, a full alphabetic keyboard is utilized in which there is one key per letter (see FIG. 12 for an example). This is preferred by some users because it can be arranged to resemble a standard keyboard with which they are most familiar. In this regard, the associated letters can be advantageously organized in QWERTY, QWERTZ, AZERTY or Dvorak layouts, among others, thereby capitalizing on certain users' familiarity with these special letter orders. In order to stay within the bounds of a limited front surface area, however, each of the keys must be commensurately small when, for example, twenty-six keys must be provided in the instance of the English language. An alternative configuration is to provide a reduced keyboard in which at least some of the keys have more than one letter associated therewith (see FIG. 13 for an example). This means that fewer keys are required which makes it possible for those fewer keys to each be larger than in the instance when a full keyboard is provided on a similarly dimensioned device. Some users will prefer the solution of the larger keys over the smaller ones, but it is necessary that software or hardware solutions be provided in order to discriminate which of the several associated letters the user intends based on a particular key actuation, a problem the full keyboard avoids. Preferably, this character discrimination is accomplished utilizing disambiguation software included on the device. To accommodate software use on the device, a memory and microprocessor are provided within the body of the handheld unit for receiving, storing, processing, and outputting data during use. Therefore, the problem of needing a textual data input means is solved by the provision of either a full or reduced alphabetic keyboard on the presently disclosed handheld electronic device. It should be further appreciated that the keyboard can be alternatively provided on a touch sensitive screen in either a reduced or full format.

Keys, typically of a push-button or touchpad nature, perform well as data entry devices but present problems to the user when they must also be used to affect navigational control over a screen-cursor. In order to solve this problem, the present handheld electronic device preferably includes an auxiliary input that acts as a cursor navigational tool and which is also exteriorly located upon the front face of the device. Its front face location is particularly advantageous because it makes the tool easily thumb-actuable like the keys of the keyboard. In a particularly useful embodiment, the navigational tool is a trackball which is easily utilized to instruct two-dimensional screen cursor movement in substantially any direction, as well as act as an actuator when the ball of the trackball is depressed like a button. The placement of the trackball is preferably above the keyboard and below the display screen; here, it avoids interference during keyboarding and does not block the user's view of the display screen during use (see FIG. 1 for an example).

In some configurations, the handheld electronic device may be standalone in that it does not connect to the "outside world." One example would be a PDA that stores such things as calendars and contact information but is not capable of synchronizing or communicating with other devices. In most situations such isolation will be viewed detrimentally in that synchronization is a highly desired characteristic of handheld devices today. Moreover, the utility of the device is significantly enhanced when connectable within a system, and particularly when connectable on a wireless basis in a network in which voice, text messaging, and other data transfer are accommodated.

As shown in FIG. 1, the handheld device 300 is cradleable in the palm of a user's hand. The handheld device is provided with a keyboard 332 to enter text data and place telephone calls and a display screen 322 for communicating information to the user. A connect/send key 6 is preferably provided to aid in the placement of a phone call. Additionally, a disconnect/end key 8 is provided. The send key 6 and end key 8 preferably are arranged in a row of keys including a navigation tool 328. Additionally, the row of keys including the navigation tool preferably has a menu key 7 and an escape key 9. The menu key 7 is used to bring up a menu and the escape key 9 is used to return to the previous screen or previous menu selection.

The user interface of a handheld device 300 provides the layout for the user to interact with the handheld device 300. Keyboard 332 allows the user to enter text data and place phone calls, navigation tool 328 allows the user to navigate applications and software programs, and display screen 322 allows the user to view the execution of input commands, applications and software programs.

Displays screens on portables devices are generally designed to facilitate mobility while providing the user with an interactive display that is easy to use. In portable devices where display screen area is limited, it may be advantageous to selectively display information. Selectively displaying information allows the user to view general information, such as an individual's name, without viewing specific details relating to the general information, such as addresses, telephone numbers, and other specific information. A user can designate or select the general information, and in response, display the specific details relating to the general information.

Figure 2A:
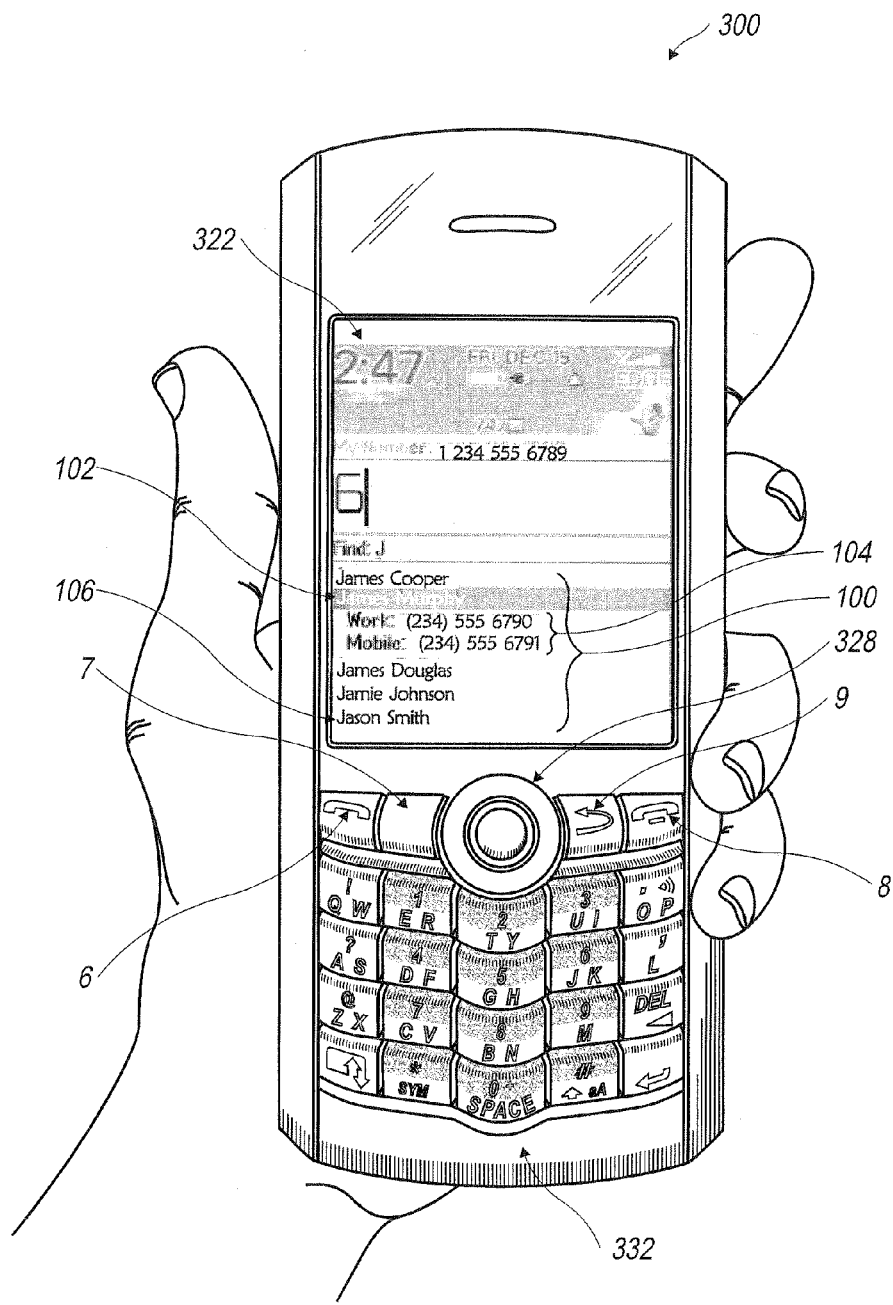
FIG. 2A depicts a handheld communication device displaying a list of contacts with a contact name designated and FIG. 2B depicts a handheld communication device displaying a list of contacts with revealed information in a pop-up window.
Figure 2B:
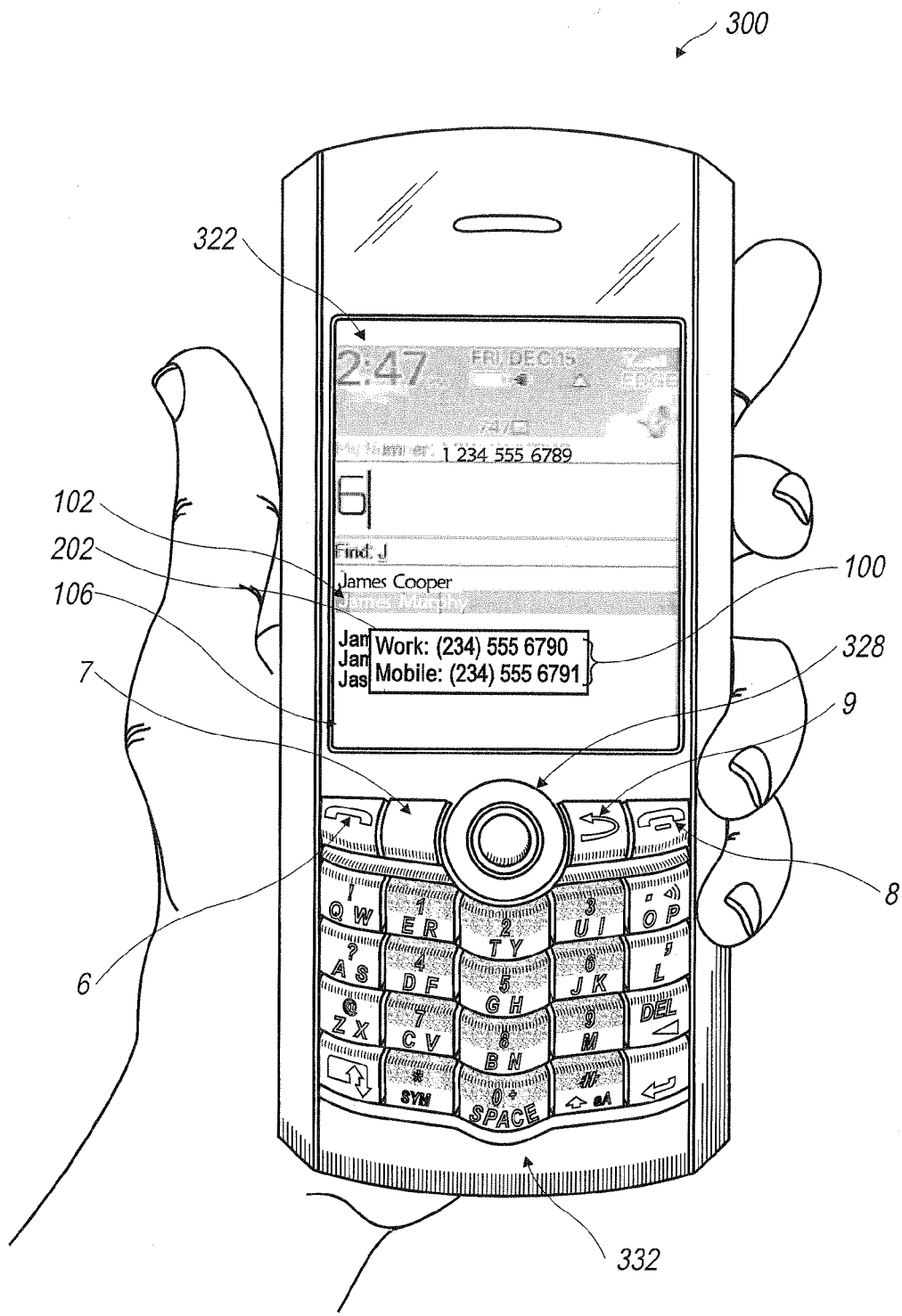
Figure 3:
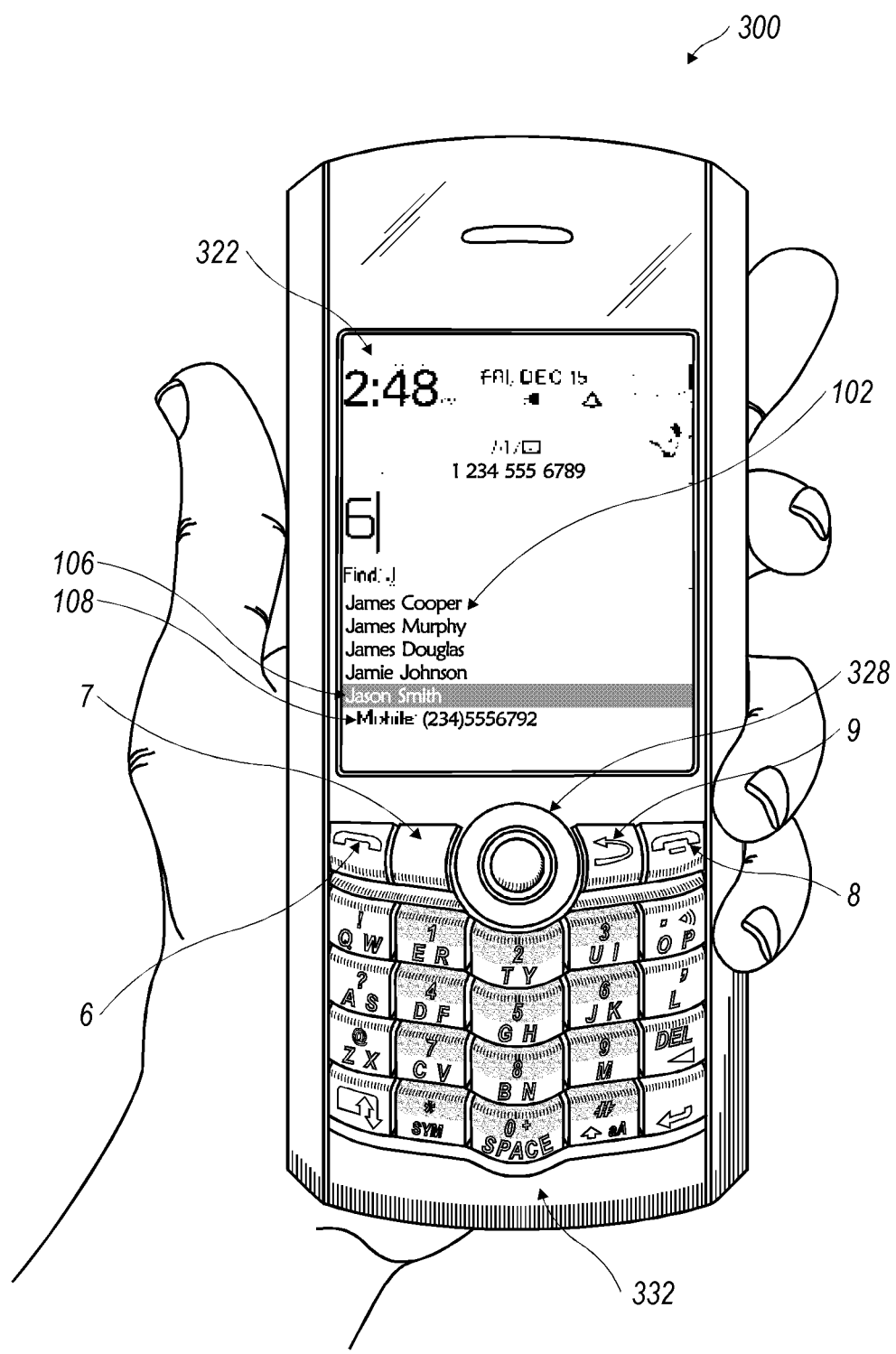
FIG. 3 depicts a handheld communication device displaying a list of contacts with a contact name designated

As seen in FIGS. 2 and 3, a list of contact names 100 are presented on display screen 322. The contact names 100 can be designated by scrolling sequentially (up or down) through the list of contact names. Scrolling is the act of sliding a horizontal or vertical presentation of content, such as text, drawings, or images, across a screen or display window. Scrolling is generally accomplished in response to a user request. Designating is the act of marking, highlighting, or otherwise signifying a specific area on a display screen. For example, a user may request to scroll down a list of names by actuating navigation tool 328, thereby designating a specific name. In one embodiment, this navigation tool is located essentially between the keyboard 332 and the display screen 322 of the handheld electronic device 300. The navigation tool can further be advantageously widthwise centered on the face of the device 300, and is preferably a trackball 121.

Referring to FIG. 2A, a contact name 102, here "James Murphy", is designated and available information 104 for "James Murphy" is revealed. Referring to FIG. 3, when James Murphy's name 102 is no longer designated and a subsequent contact name 106, here "Jason Smith", is selected, available information 108 for "Jason Smith" 106 can be revealed; while James Murphy's available information is concealed. As seen in FIG. 2A, available information can be revealed by expanding the page area between two individual contact names and presenting the available information between the expanded contact names. As seen in FIG. 2B, in another example embodiment, the available information is revealed by displaying the available information over the top of other contact names; when a contact name is designated, the available information can be revealed by popping-up in the display screen, as in, for example, a pop-up window 202.

In one embodiment of the present technology, when the user scrolls down the list of contact names, only the names of contacts are designated. In another embodiment of the present technology, the user scrolls down the list of contact names, and must first scroll through the available information of the designated contact before being able to designate the subsequent name in the list. For example, when a specific contact name is designated, the available information, such as a telephone number, is revealed; if the user wishes to designate a subsequent contact name the user first scrolls through the revealed available information prior to designating the subsequent contact name. Generally, when a user scrolls up the list he/she would not be required to scroll through the available information because the information is generally presented below the contact name, however, the present technology recognizes that when a user is scrolling up the list of contact names that available information may be presented above the contact name, and thus, require the user to scroll through the available information.

In yet another embodiment, the available information for a particular contact can remain hidden until a specified period of time has elapsed. In a particular embodiment, the user scrolls down the list of contact names, and the available information for the designated contact is revealed only after the user maintains selections of the designated contact for a specified period of time. The user must maintain selection of the designated contact for a period of time that ranges between 0.5 and 2 seconds, and preferably the time period is approximately one second. Thus, as the user can scroll through the list of contact names until the desired contact is reached before the available information is shown to the user. In still another embodiment, the user scrolls down the list of contact names, and the available information of the designated contact is revealed, but user bypasses the information while scrolling unless a specified period of time elapses. Thus, the available information is displayed to the user but the user is not required to scroll through this information, unless the user maintains selection of the designated contact for a specified period of time. This time can be one of the above specified periods.

When a user designates available information, the user may further select the available information to prompt some type of automatic response from the device. For example, if the device includes wireless communication capabilities, and the available information includes a telephone number (as seen in FIGS. 2 and 3), selection of the telephone number can prompt the device to call the number, or prompt the device to simply enter the number whereupon the user could confirm that the number be called (e.g. pressing send button 6). Selection of a telephone number could also facilitate sending text messages. Likewise, if the available information is an email address, a selection of the email address could open an email client with the contact's information pre-filled and allow the user to send an email.

Preferably, the handheld electronic device 300 is sized for portable use and to be pocketed. In one embodiment, the handheld electronic device 300 is sized to be cradled in the palm of the user's hand. The handheld electronic device 300 is advantageously sized such that it is longer than wide. This preserves the device's 300 cradleability while maintaining surface real estate for such things as the display screen 322 and keyboard 332. In a development of this embodiment, the handheld electronic device 300 is sized such that the width of the handheld electronic device 300 measures between approximately two and three inches thereby facilitating the device 300 to be palm cradled. Furthermore, these dimension requirements may be adapted in order to enable the user to easily carry the device 300.

Furthermore, the handheld electronic device 300 is preferably capable of communication within a wireless network 319. Thus, this device 300 can be described as a wireless handheld communication device 300. A device 300 that is so configured is capable of transmitting data to and from a communication network 319 utilizing radio frequency signals. The wireless communication device 300 can be equipped to send voice signals as well as data information to the wireless network 319. The wireless communication device 300 is capable of transmitting textual data as well as other data including but not limited to graphical data, electronic files, and software.

Figure 16:
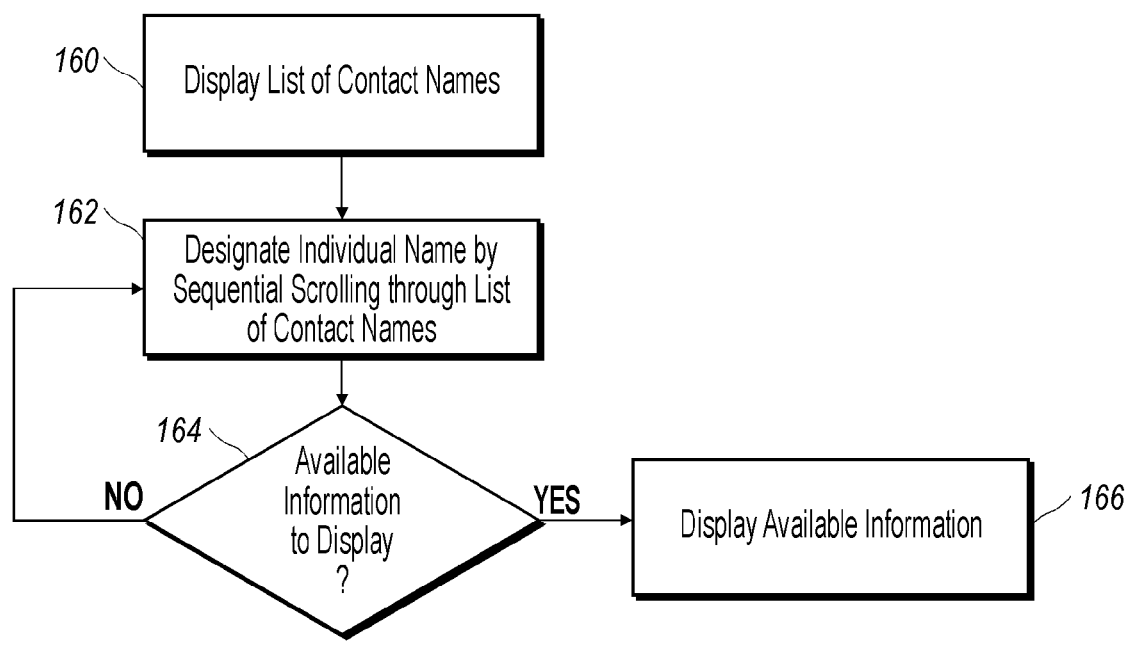
FIG. 16 is a block diagram representing a method in accordance with the present technology.

Referring to FIG. 16, a method in accordance with the present technology is graphically represented. The method includes displaying a list of contact names 160. Designation of an individual contact name 162 from the displayed list of contacts can reveal available information 166 about the contact. If there is no available information to be revealed, steps 162 and 164 are repeated. Generally, designation is accomplished by scrolling sequentially through the list of contact names. In other embodiments, the method also includes the various features described throughout in relation to the handheld device embodiments. These various features include dimensional options, communication options, auxiliary input options as described above in relation to the handheld electronic device embodiment. Additionally, the options available for the method are the same as those described in relation to the processing subsystem and handheld device embodiments.

In another embodiment of the present technology a processing subsystem is configured to be installed on the handheld electronic device. The processing subsystem includes operating system software that is programmed to control the operation of the handheld electronic device. The operating system is also configured to view contact information on the handheld device. The operating system is configured to display a list of contact names on the display screen. The operating system is also configured to allow for the designation of individual contact names. Upon designation of an individual contact name, available information about the contact is revealed. Generally, designation is accomplished by scrolling sequentially through the list of contact names. In other embodiments, the processing subsystem also includes the various features described above in relation to the handheld device embodiments. These various features include dimensional options, communication options, auxiliary input options and short menu sizing as described throughout in relation to the handheld electronic device embodiment. Additionally, the options available for the processing subsystem are the same as those described in relation to the method and handheld device embodiments.

Further aspects of the environments, devices and methods of employment described hereinabove are expanded upon in the following details. An exemplary embodiment of the handheld electronic device 300 as shown in FIG. 1 is cradleable in the palm of a user's hand. The size of the device is such that a user is capable of operating the device 300 using the same hand that is holding the device 300. In a preferred embodiment, the user is capable of actuating all features of the device 300 using the thumb of the cradling hand; however, in other embodiments features may require the use of more than just the thumb of the cradling hand. The preferred embodiment of the handheld device 300 features a keyboard on the face of the device 300, which is actuable by the thumb of the hand cradling the device 300. The user may also hold the device 300 in such a manner to enable two thumb typing on the device 300.

The handheld electronic device 300 includes an input portion and an output display portion. The output display portion can be a display screen 322, such as an LCD or other similar display device.

The input portion includes a plurality of keys that can be of a physical nature such as actuable buttons or they can be of a software nature, typically constituted by virtual representations of physical keys on a display screen (referred to herein as "software keys"). It is also contemplated that the user input can be provided as a combination of the two types of keys. Each key of the plurality of keys has at least one actuable action which can be the input of a character, a command or a function. In this context, "characters" are contemplated to exemplarily include alphabetic letters, language symbols, numbers, punctuation, insignias, icons, pictures, and even a blank space. Input commands and functions can include such things as delete, backspace, moving a cursor up, down, left or right, initiating an arithmetic function or command, initiating a command or function specific to an application program or feature in use, initiating a command or function programmed by the user and other such commands and functions that are well known to those persons skilled in the art. Specific keys or other types of input devices can be used to navigate through the various applications and features thereof. Further, depending on the application or feature in use, specific keys can be enabled or disabled.

In the case of physical keys, all or a portion of the plurality of keys have one or more indicia, representing character(s), command(s), and/or functions(s), displayed at their top surface and/or on the surface of the area adjacent the respective key. In the instance where the indicia of a key's function is provided adjacent the key, the indicia can be printed on the device cover beside the key, or in the instance of keys located adjacent the display screen 322. Additionally, current indicia for the key may be temporarily shown nearby the key on the screen 322.

In the case of software keys, the indicia for the respective keys are shown on the display screen 322, which in one embodiment is enabled by touching the display screen 322, for example, with a stylus to generate the character or activate the indicated command or function. Some examples of display screens 322 capable of detecting a touch include resistive, capacitive, projected capacitive, infrared and surface acoustic wave (SAW) touchscreens.

Physical and software keys can be combined in many different ways as appreciated by those skilled in the art. In one embodiment, physical and software keys are combined such that the plurality of enabled keys for a particular application or feature of the handheld electronic device 300 is shown on the display screen 322 in the same configuration as the physical keys. Using this configuration, the user can select the appropriate physical key corresponding to what is shown on the display screen 322. Thus, the desired character, command or function is obtained by depressing the physical key corresponding to the character, command or function displayed at a corresponding position on the display screen 322, rather than touching the display screen 322.

Figures 4, 5, 6:
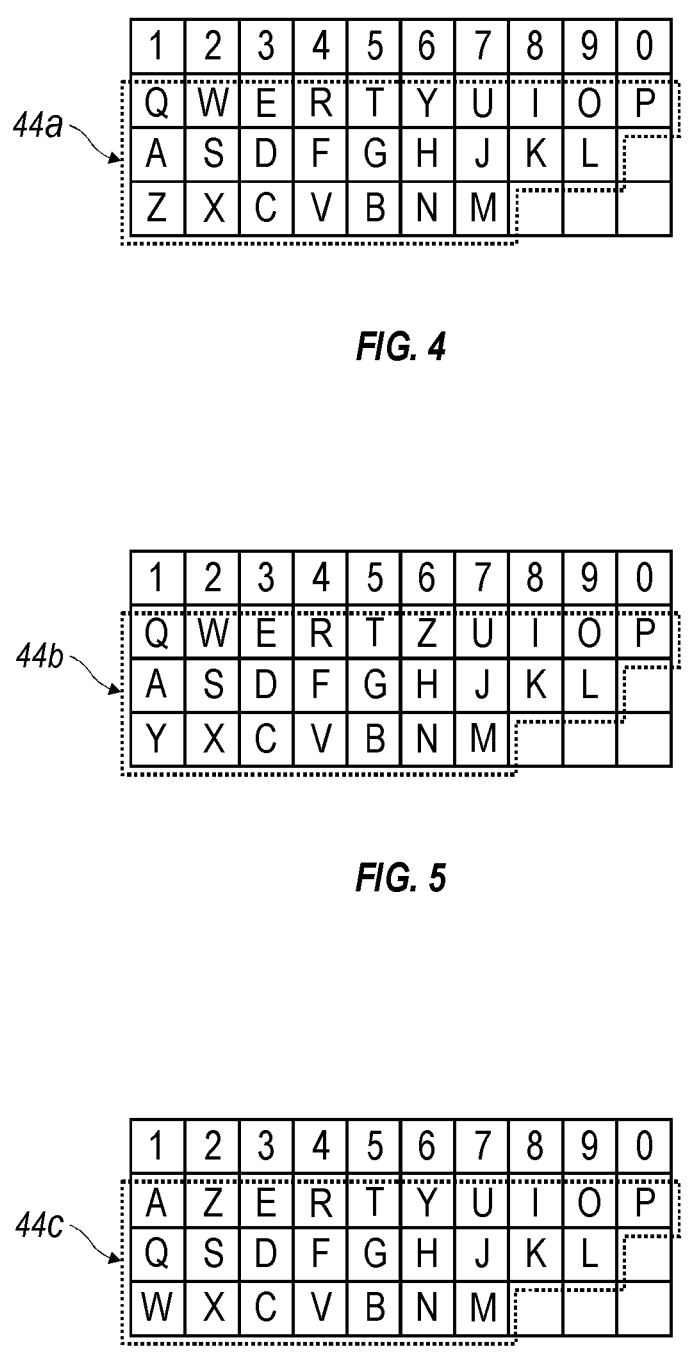

The various characters, commands and functions associated with keyboard typing in general are traditionally arranged using various conventions. The most common of these in the United States, for instance, is the QWERTY keyboard layout. Others include the QWERTZ, AZERTY, and Dvorak keyboard configurations. The QWERTY keyboard layout is the standard English-language alphabetic key arrangement 44a shown in FIG. 4. The QWERTZ keyboard layout is normally used in German-speaking regions; this alphabetic key arrangement 44b is shown in FIG. 5. The AZERTY keyboard layout 44c is normally used in French-speaking regions and is shown in FIG. 6. The Dvorak keyboard layout was designed to allow typists to type faster; this alphabetic key arrangement 44d is shown in FIG. 7.

Alphabetic key arrangements are often presented along with numeric key arrangements. Typically, the numbers 1-9 and 0 are positioned in the row above the alphabetic keys 44a-d, as shown in FIG. 4-7. Alternatively, the numbers share keys with the alphabetic characters, such as the top row of the QWERTY keyboard (see FIG. 11 for an example). Yet another exemplary numeric key arrangement is shown in FIG. 8, where a "ten-key" style numeric keypad 46 is provided on a separate set of keys that is spaced from the alphabetic/numeric key arrangement 44. The ten-key styled numeric keypad 46 includes the numbers "7", "8", "9" arranged in a top row, "4", "5", "6" arranged in a second row, "1", "2", "3" arranged in a third row, and "0" in a bottom row. Further, a numeric phone key arrangement 42 is exemplarily illustrated in FIG. 9.

Figures 7, 8, 9, 10:
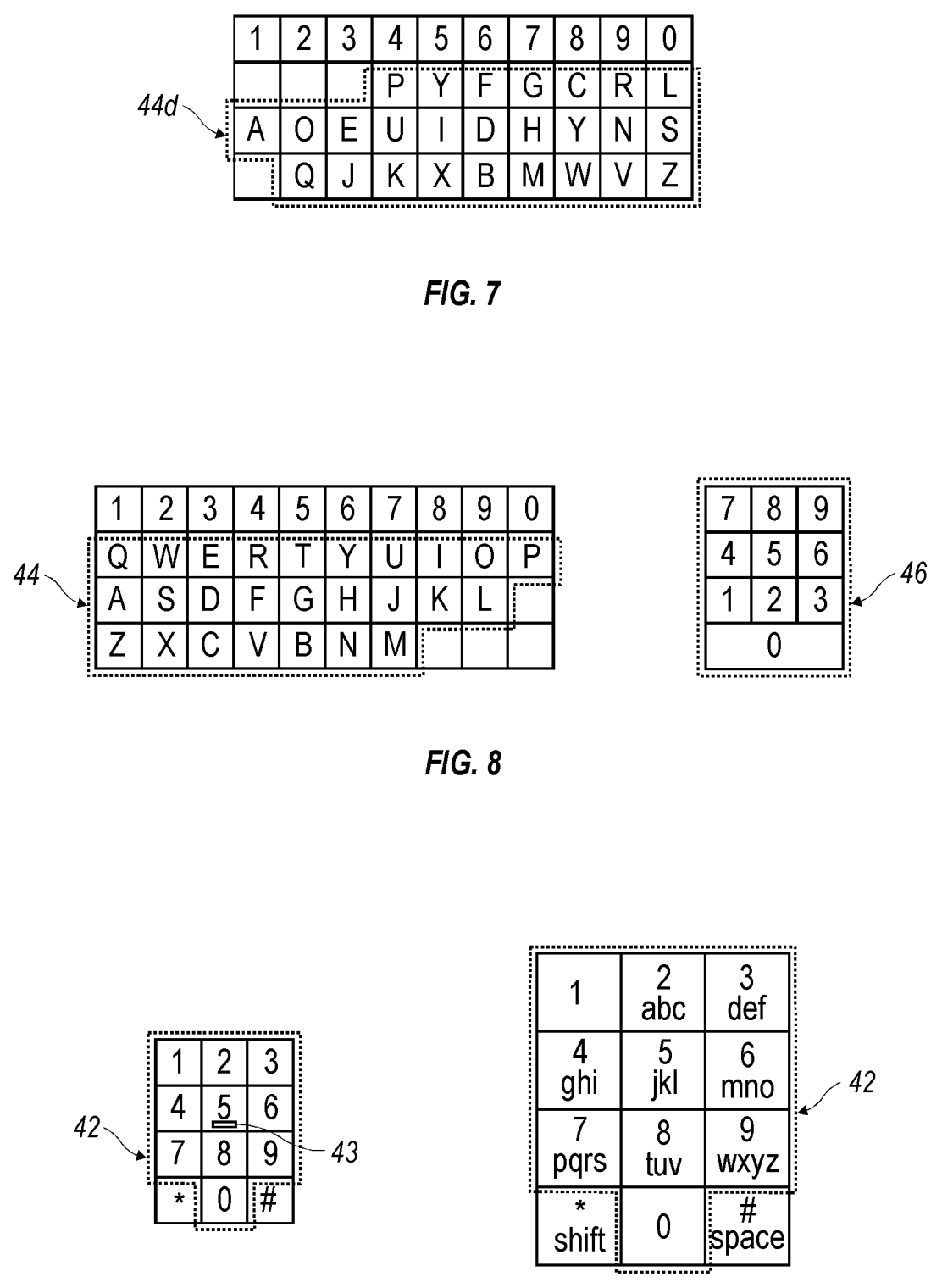

As shown in FIG. 9, the numeric phone key arrangement 42 may also utilize a surface treatment on the surface of the center "5" key. This surface treatment is configured such that the top surface of the key is distinctive from the surface of other keys. Preferably the surface treatment is in the form of a raised bump or recessed dimple 43. Alternatively, raised bumps may be positioned on the housing around the "5" key and do not necessarily have to be positioned directly on the key.

It is desirable for handheld electronic devices 300 to include a combined text-entry keyboard and a telephony keyboard. Examples of such mobile communication devices 300 include mobile stations, cellular telephones, wireless personal digital assistants (PDAs), two-way paging devices, and others. Various keyboards are used with such devices and can be termed a full keyboard, a reduced keyboard, or phone key pad.

In embodiments of a handheld electronic device 300 having a full keyboard, the alphabetic characters are singly associated with the plurality of physical keys. Thus, in an English-language keyboard of this configuration, there are at least 26 keys in the plurality so that there is at least one key for each letter.

Figure 11:
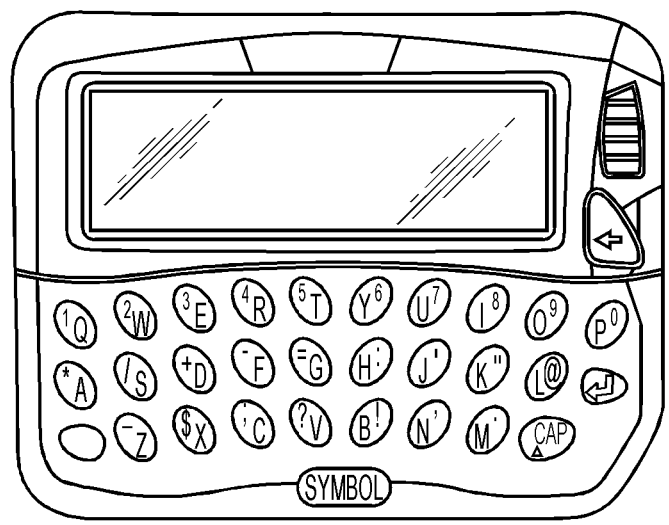
FIG. 11 is a front view of an exemplary handheld electronic device including a full QWERTY keyboard.
Figure 12:
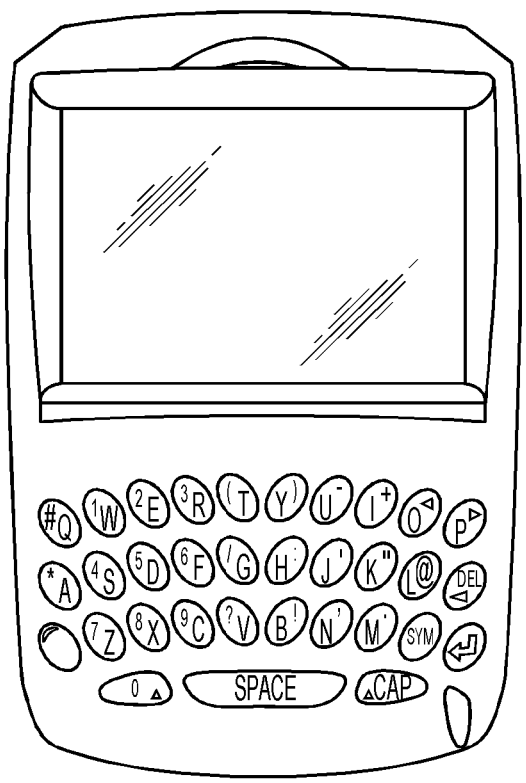
FIG. 12 is a front view of another exemplary handheld electronic device including a full QWERTY keyboard.

Devices 300 incorporating full keyboards for the alphabetic characters are shown in FIGS. 11 and 12. While both devices feature numeric keys, the device shown in FIG. 11 incorporates the numeric keys in a single row, whereas the device of FIG. 12 features numeric keys arranged according to the ITU Standard E.161 as shown in FIG. 9. The latter numeric arrangement can be described as an overlaid numeric phone keypad arrangement.

As intimated above, in order to further reduce the size of a handheld electronic device 300 without making the physical keys or software keys too small, some handheld electronic devices 300 use a reduced keyboard, where more than one character/command/function is associated with each of at least a portion of the plurality of keys. This results in certain keys being ambiguous since more than one character is represented by or associated with the key, even though only one of those characters is typically intended by the user when activating the key.

Thus, certain software usually runs on the processor of these types of handheld electronic device 300 to determine or predict what letter or word has been intended by the user. Some examples of software include predictive text routines which typically include a disambiguation engine and/or predictive editor application. The software preferably also has the ability to recognize character letter sequences that are common to the particular language, such as, in the case of English, words ending in "ing." Such systems can also "learn" the typing style of the user making note of frequently used words to increase the predictive aspect of the software. Other types of predictive text computer programs may be utilized with the reduced keyboard arrangements described herein, without limitation. Some specific examples include the multi-tap method of character selection and "text on nine keys".

The keys of reduced keyboards are laid out with various arrangements of characters, commands and functions associated therewith. In regards to alphabetic characters, the different keyboard layouts identified above are selectively used based on a user's preference and familiarity; for example, the QWERTY keyboard layout is most often used by English speakers who have become accustomed to the key arrangement.

FIG. 1 shows a handheld electronic device 300 that carries an example of a reduced keyboard using the QWERTY keyboard layout on a physical keyboard array of twenty keys comprising five columns and four rows. Fourteen keys are used for alphabetic characters and ten keys are used for numbers. Nine of the ten numbers share a key with alphabetic characters. The "space" key and the number "0" share the same key, which is centered on the device and centered below the remainder of the numbers on the keyboard 332. While in other embodiments, the number "0" may be located on other keys.

Figure 13:
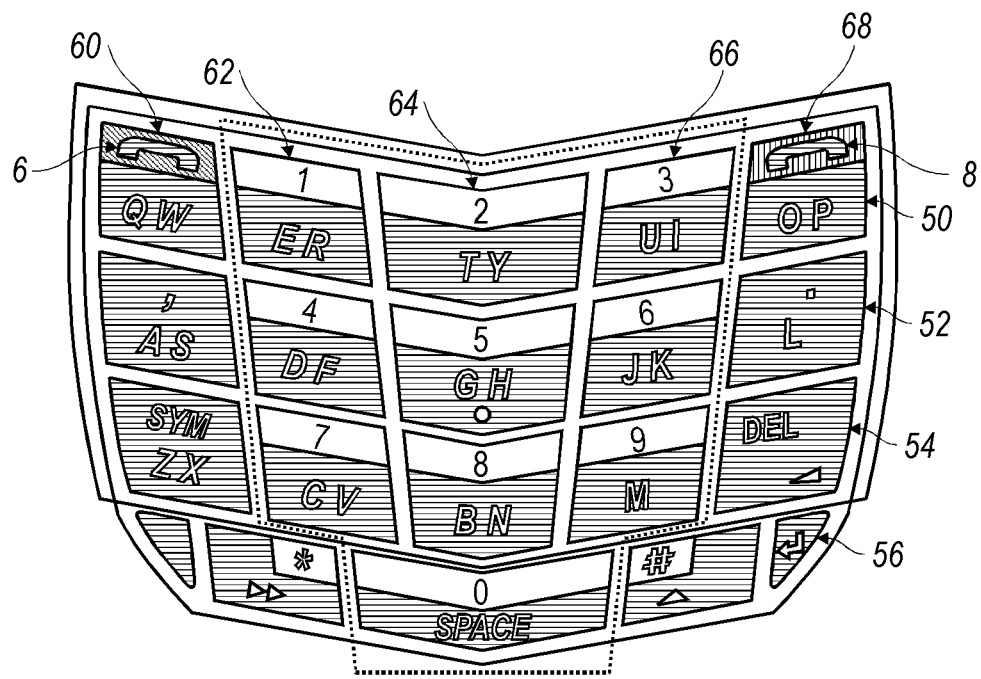
FIG. 13 is a detail view of a reduced QWERTY keyboard.

FIG. 13 shows an example physical keyboard array of 20 keys composed of five columns and four rows. Fourteen keys on the keyboard 332 are associated with alphabetic characters and ten keys are associated with numbers. Many of the keys have different sizes than the other keys, and the rows are non-linear. In particular, the keys in the middle column 64 are wider than keys in the outer columns 60, 62, 66 and 68. To readily identify the phone user interface (the second user interface), the numeric phone keys 0-9 include a color scheme that is different from that of the remaining keys associated with the QWERTY key arrangement.

In this example, a color scheme of the numeric phone keys has a two tone appearance, with the upper portion of the numeric keys being a first color and the lower portion of the numeric keys being a second color. The first color may be lighter than the second color, or darker than the second color. Furthermore, the send key 6 and end key 8 are located on keys with alphabetic indicia have a background color and/or color of the symbols that are different from the other keys of the keyboard 332.

Figure 14:
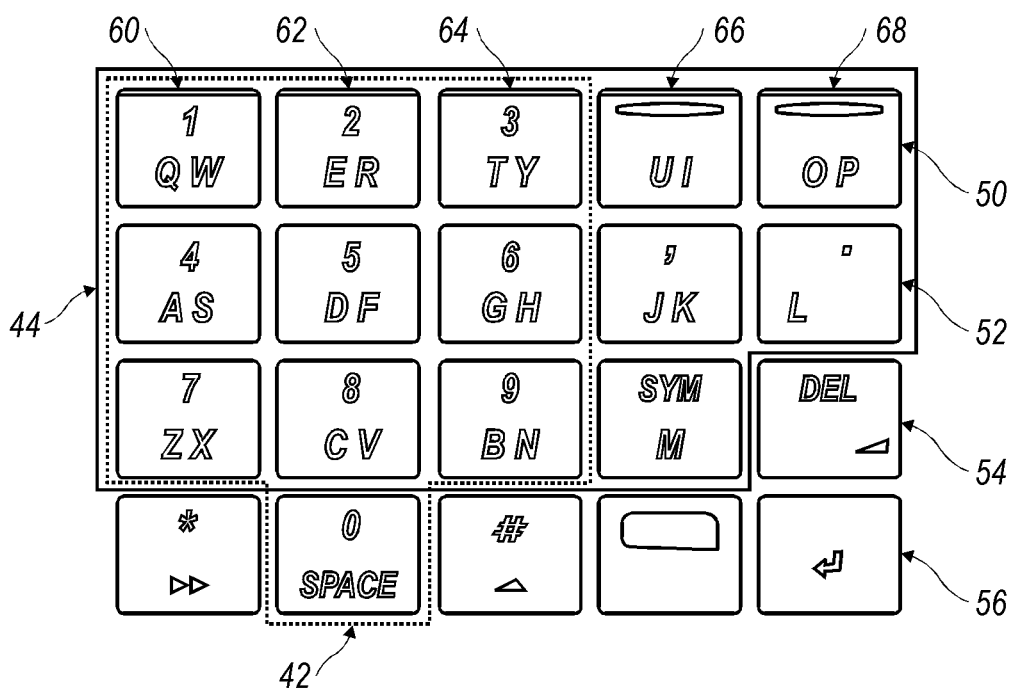
FIG. 14 is a detail view of an alternative reduced QWERTY keyboard.

FIG. 14 shows a similar format for the reduced QWERTY arrangement of alphabetic characters 44 as presented in FIG. 14, but the numeric phone key arrangement 42 is positioned in the first 60, second 62, and third 64 columns instead of being centered on the keyboard 332. Thus, no numerals are presented on keys in the fourth 66 and fifth 68 columns. The first row 50 of keys includes in order the following key combinations for the text entry and telephony mode: "QW/1", "ER/2", "TY/3", "UI", and "OP". The second row 52 includes the following key combinations in order: "AS/4", "DF/5", "GH/6", "JK/,", and "L/." The third row 54 includes the following key combinations in order: "ZX/7", "CV/8", "BN/9", "M/sym" and "backspace/delete". The fourth row 56 includes the following key combinations in order: "next/*", "space/0", "shift/#", "alt" and "return/enter". The keys in each of the rows are of uniform size and the rows and columns are straight.

Another embodiment of a reduced alphabetic keyboard is found on a standard phone keypad. Most handheld electronic devices having a phone key pad also typically include alphabetic key arrangements overlaying or coinciding with the numeric keys as shown in FIG. 10. Such alphanumeric phone keypads are used in many, if not most, traditional handheld telephony mobile communication devices such as cellular handsets.

As described above, the International Telecommunications Union ("ITU") has established phone standards for the arrangement of alphanumeric keys. The standard phone numeric key arrangement shown in FIGS. 9 (no alphabetic letters) and 10 (with alphabetic letters) corresponds to ITU Standard E.161, entitled "Arrangement of Digits, Letters, and Symbols on Telephones and Other Devices That Can Be Used for Gaining Access to a Telephone Network." This standard is also known as ANSI TI.703-1995/1999 and ISO/IEC 9995-8:1994. Regarding the numeric arrangement, it can be aptly described as a top-to-bottom ascending order three-by-three-over-zero pattern.

Figure 15:
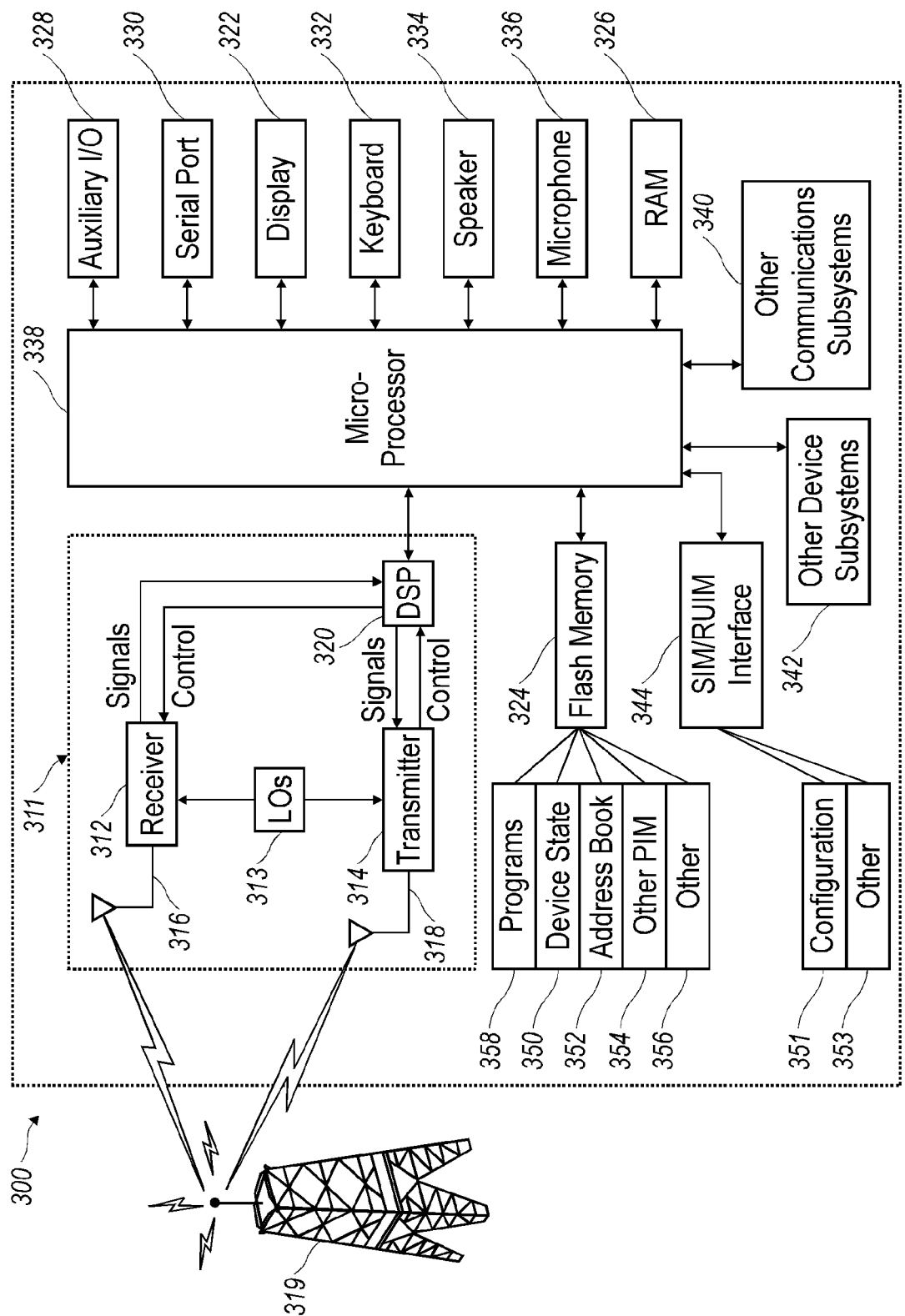
FIG. 15 is a block diagram representing a wireless handheld communication device interacting in a communication network.

An exemplary handheld electronic device 300 and its cooperation in a wireless network 319 is exemplified in the block diagram of FIG. 15. This figure is exemplary only, and those persons skilled in the art will appreciate the additional elements and modifications necessary to make the device 300 work in particular network environments.

The block diagram of FIG. 15 representing the communication device 300 interacting in the communication network 319 shows the device's 300 inclusion of a microprocessor 338 which controls the operation of the device 300. The communication subsystem 311 performs all communication transmission and reception with the wireless network 319. The microprocessor 338 further connects with an auxiliary input/output (I/O) subsystem 328, a serial port (preferably a Universal Serial Bus port) 330, a display 322, a keyboard 332, a speaker 334, a microphone 336, random access memory (RAM) 326, and flash memory 324. Other communication subsystems 340 and other device subsystems 342 are generally indicated as connected to the microprocessor 338 as well. An example of a communication subsystem 340 is that of a short range communication subsystem such as BLUETOOTH® communication module or an infrared device and associated circuits and components. Additionally, the microprocessor 338 is able to perform operating system functions and preferably enables execution of software applications on the communication device 300.

The above described auxiliary I/O subsystem 328 can take a variety of different subsystems including the above described navigation tool. The navigation tool is preferably a trackball based device, but it can be a thumbwheel, navigation pad, or joystick. These navigation tools are preferably located on the front surface of the device 300 but may be located on an exterior surface of the device 300. Other auxiliary I/O devices can include external display devices and externally connected keyboards (not shown). While the above examples have been provided in relation to the auxiliary I/O subsystem, other subsystems capable of providing input or receiving output from the handheld electronic device 300 are considered within the scope of this disclosure. Additionally, other keys may be placed along the side of the device 300 to function as escape keys, volume control keys, scrolling keys, power switches, or user programmable keys, which may be programmed accordingly.

In an exemplary embodiment, the flash memory 324 is enabled to provide a storage location for the operating system, device programs, and data. While the operating system in a preferred embodiment is stored in flash memory 324, the operating system in other embodiments is stored in read-only memory (ROM) or similar storage element (not shown). As those skilled in the art will appreciate, the operating system, device application or parts thereof may be loaded in RAM 326 or other volatile memory.

In a preferred embodiment, the flash memory 324 contains programs/applications 358 for execution on the device 300 including an address book 352, a personal information manager (PIM) 354, and the device state 350. Furthermore, programs 358 and other information 356 including data can be segregated upon storage in the flash memory 324 of the device 300.

When the device 300 is enabled for two-way communication within the wireless communication network 319, it can send and receive signals from a mobile communication service. Examples of communication systems enabled for two-way communication include, but are not limited to, the GPRS (General Packet Radio Service) network, the UMTS (Universal Mobile Telecommunication Service) network, the EDGE (Enhanced Data for Global Evolution) network, and the CDMA (Code Division Multiple Access) network and those networks generally described as packet-switched, narrowband, data-only technologies mainly used for short burst wireless data transfer. For the systems listed above, the communication device 300 must be properly enabled to transmit and receive signals from the communication network 319. Other systems may not require such identifying information. GPRS, UMTS, and EDGE require the use of a SIM (Subscriber Identity Module) in order to allow communication with the communication network 319. Likewise, most CDMA systems require the use of a RUIM (Removable Identity Module) in order to communicate with the CDMA network. The RUIM and SIM card can be used in multiple different communication devices 300. The communication device 300 may be able to operate some features without a SIM/RUIM card, but it will not be able to communicate with the network 319. A SIM/RUIM interface 344 located within the device allows for removal or insertion of a SIM/RUIM card (not shown). The SIM/RUIM card features memory and holds key configurations 351, and other information 353 such as identification and subscriber related information. With a properly enabled communication device 300, two-way communication between the communication device 300 and communication network 319 is possible.

If the communication device 300 is enabled as described above or the communication network 319 does not require such enablement, the two-way communication enabled device 300 is able to both transmit and receive information from the communication network 319. The transfer of communication can be from the device 300 or to the device 300. In order to communicate with the communication network 319, the device 300 in a preferred embodiment is equipped with an integral or internal antenna 318 for transmitting signals to the communication network 319. Likewise the communication device 300 in the preferred embodiment is equipped with another antenna 316 for receiving communication from the communication network 319. These antennae (316, 318) in another preferred embodiment are combined into a single antenna (not shown). As one skilled in the art would appreciate, the antenna or antennae (316, 318) in another embodiment are externally mounted on the device 300.

When equipped for two-way communication, the communication device 300 features a communication subsystem 311. As is well known in the art, this communication subsystem 311 is modified so that it can support the operational needs of the device 300. The subsystem 311 includes a transmitter 314 and receiver 312 including the associated antenna or antennae (316, 318) as described above, local oscillators (LOs) 313, and a processing module 320 which in a preferred embodiment is a digital signal processor (DSP) 320.

It is contemplated that communication by the device 300 with the wireless network 319 can be any type of communication that both the wireless network 319 and device 300 are enabled to transmit, receive and process. In general, these can be classified as voice and data. Voice communication is communication in which signals for audible sounds are transmitted by the device 300 through the communication network 319. Data is all other types of communication that the device 300 is capable of performing within the constraints of the wireless network 319.

Exemplary embodiments have been described hereinabove regarding both handheld electronic devices, as well as the communication networks within which they cooperate. It should be appreciated, however, that a focus of the present disclosure is the enablement of a user of such wireless handheld electronic devices to scroll through contact names efficiently and display information relating to a designated contact name.

What is claimed is:

1. A method for selectively displaying contact information on a display screen of a handheld electronic device, said method comprising:
   displaying a list of contact names on the display screen of the handheld electronic device;
   detecting output from a navigation tool;
   scrolling sequentially through said list of contact names in response to the detected output from the navigation tool;
   designating a first contact name in the list of contact names in response to sequentially scrolling through said list of contact names;
   revealing available information about the first contact name in response to the designation of the first contact name for a predetermined time;
   detecting further output from the navigation tool;
   scrolling sequentially through the revealed available information in response to the detected further output from the navigation tool;
   detecting additional further output from the navigation tool;
   only designating an adjacent contact name after all of the revealed available information about the first contact name has been sequentially scrolled through without requiring revealing available information about the adjacent contact name in response to the detected additional further output from the navigation tool.

2. The method of claim 1, wherein said revealing comprises expanding an area on the display screen between the first individual contact name and the second individual contact name and displaying said available information in the expanded area.

3. The method of claim 1, wherein said revealing comprises displaying on the display screen the available information over top of contact names other than the first individual contact name.

4. The method of claim 1, wherein said revealing comprises displaying the available information in a pop-up window on the display screen.

5. The method of claim 1, further comprising concealing the available information in response to the designation of the second individual contact name.

6. The method of claim 1, further comprising displaying a prompt in response to said designation of the portion of the available information.

7. The method of claim 1, wherein said available information includes an email address and said prompt comprises an email message containing the contact name as an intended recipient if the designated portion is the email address.

8. The method of claim 1, wherein said available information includes a telephone number.

9. The method of claim 1, further comprising automatically dialing the telephone number if the designated portion is the telephone number.

10. The method of claim 1, wherein detecting the output from the navigation tool comprises detecting output from a trackball.

11. A handheld electronic device programmed for selectively displaying contact information thereon, said handheld electronic device comprising:
   a navigation tool;
   a display screen for displaying a list of contact names; and a microprocessor having a control program associated therewith for controlling operation of said handheld electronic device, said control program being configured to:

display a list of contact names on the display screen of the handheld electronic device;

detect output from the navigation tool;

scroll sequentially through said list of contact names in response to the detected output from the navigation tool;

designate an individual contact name in the list of contact names in response to sequentially scrolling through said list of contact names;

reveal available information about the first individual contact name in response to the designation of the individual contact name for a predetermined time;

detect further output from the navigation tool;

scroll sequentially through the revealed available information in response to the detected further output from the navigation tool;

detect additional further output from the navigation tool; and only designating an adjacent contact name after all of the revealed available information about the first contact name has been sequentially scrolled through without requiring revealing available information about the adjacent contact name in response to the detected additional further output from the navigation tool.

12. The handheld electronic device of claim 11, wherein said control program being configured to reveal available information comprises said control program being configured to expand an area between the first individual contact name and the second individual contact name and display said available information about the individual contact name in said area.

13. The handheld electronic device of claim 11, wherein said control program is further configured to conceal said available information of the first individual contact name in response to the designation of the second individual contact name.

14. The handheld electronic device of claim 11, wherein said control program being configured to reveal available information comprises said control program being configured to display on the display screen the available information over top of contact names other than the first individual contact name.

15. The handheld device of claim 11, wherein said control program being configured to reveal available information comprises said control program being configured to display the available information in a pop-up window on the display screen.

16. The handheld electronic device of claim 11, wherein said control program is further configured to display a prompt in response to said designation of the portion of the available information.

17. The handheld electronic device of claim 16, wherein said available information includes an email address and said prompt is an email message containing the contact name as an intended recipient if the designated portion is the email address.

18. The handheld electronic device of claim 11, wherein said available information includes a telephone number.

19. The handheld electronic device of claim 18, wherein said control program is further configured to automatically dial the telephone number if the designated portion is the telephone number.

20. The handheld electronic device of claim 11, wherein said navigation tool is a trackball.

* * * * *